United States Patent [19]

König et al.

[11] Patent Number: 5,422,413
[45] Date of Patent: Jun. 6, 1995

[54] THERMOSETTING COATING COMPOSITION AND ITS USE FOR PRIMER COATINGS ON METAL SUBSTRATES

[75] Inventors: Eberhard König, Köln; Friedrich P. A. Schrader; Lilli M. Schrader née Guse, both of Leichlingen; Elke Lückgen née Schrader, Monheim; Stefan Schrader; Hans-Heribert Burgdörfer, both of Köln, all of Germany

[73] Assignee: Bayer Aktiengesellschaft, Leverkusen, Germany

[21] Appl. No.: 956,513

[22] Filed: Oct. 5, 1992

[30] Foreign Application Priority Data

Oct. 10, 1991 [DE] Germany ............... 41 33 517.1

[51] Int. Cl.⁶ ............................................. C08G 18/81
[52] U.S. Cl. ........................................ 528/45; 528/59; 528/61; 528/62; 528/65
[58] Field of Search ................ 528/45, 59, 61, 62, 528/65

[56] References Cited

U.S. PATENT DOCUMENTS

| | | | |
|---|---|---|---|
| 3,770,703 | 11/1973 | Gruber | 260/77.5 TB |
| 4,363,686 | 12/1982 | Komarek | 156/242 |
| 4,694,051 | 9/1987 | Kordomenos et al. | 525/437 |
| 4,894,428 | 1/1990 | Thoma et al. | 528/45 |
| 5,061,775 | 10/1991 | Schmalstieg | 528/45 |

Primary Examiner—Paul R. Michl
Assistant Examiner—Duc Truong
Attorney, Agent, or Firm—Joseph C. Gil; Thomas W. Roy; Richard E. L. Henderson

[57] ABSTRACT

The present invention relates to a thermosetting coating composition based on a binder composition containing A) prepolymers containing isocyanate groups blocked with ε-caprolactam, having an average molecular weight of 1000 to 10,000 and prepared from
   A1) aromatic polyisocyanates and
   A2) a component containing at least one organic compound having hydroxyl groups wherein 50 to 100 hydroxyl equivalent percent of component A2) is based on polyesters containing hydroxyl groups and 0 to 50 hydroxyl equivalent percent is based on polyhydroxyl compounds which are free from ester groups and
B) a hardener component containing at least one cycloaliphatic polyamine having at least two primary amino groups, in an equivalent ratio of blocked isocyanate groups to amino groups of 1:1 to 1:1.5.

The invention also relates to use of the coating compositions to produce stoving-resistant gravel-proof primer coatings on optionally pretreated metal substrates.

2 Claims, No Drawings

1

THERMOSETTING COATING COMPOSITION AND ITS USE FOR PRIMER COATINGS ON METAL SUBSTRATES

BACKGROUND OF THE INVENTION

1. Field of the Invention

The invention relates to novel thermosetting coating compositions based on ε-caprolactam-blocked isocyanate prepolymers and cycloaliphatic polyamines and use thereof for producing stoving-resistant gravel-proof primer coatings on metal substrates.

2. Description of the Prior Art

Gravel-proof primer coatings on cars have to meet special mechanical requirements-in order to protect the multi-layer coating structure from damage from gravel and ultimately to prevent the car-body sheet from corrosion.

One known solution is to use coating compositions containing polyurethane ureas. Polyurethane urea binders for producing thick coatings must be produced from relatively low molecular components, i.e., blocked NCO prepolymers and diamines. These binders are known and described in the prior art, e.g., in DE-PS 2 131 299. The ε-caprolactam-blocked NCO prepolymers described in this reference are obtained by reacting aromatic diisocyanates with polymerization or polycondensation products containing hydroxyl groups and are inert towards amines. The compounds containing hydroxyl groups which are used to produce the NCO prepolymers are preferably the polyether polyols known from polyurethane chemistry. Polyester polyols are not mentioned in this connection, apparently because of the possibility of aminolytic side-reactions between the ester bonds and the free amino groups in the activator during storage and cross-linking of the coating compositions. The advantage of the system in the citation lies in the interaction between hard segments (polyurea groups) and soft segments (polyether components) which provide the viscoplastic coating properties for good protection against gravel.

The known binders, however, have the disadvantage of sensitivity to an increase in the stoving temperature. If they are stoved at exactly 160° C., optimum film properties are obtained. If the stoving temperature is increased to only 180° C., the film is permanently soft. If the stoving temperature is 200° C., the film properties become even worse. The result, particularly in the "overspray" region, where the thick layer of anti-gravel coating becomes thin, is often a loss of adhesiveness in the subsequently-applied filler and additional coating layers.

In practice, particularly in car coatings, the stoving temperature cannot always be maintained narrowly between 160° and 170° C., as required for optimum properties of the known coating compositions. There is therefore a demand for "stoving-resistant," coating compositions, which can withstand stoving temperatures of up to 200° C. without adverse effects on the properties of the coatings.

Accordingly, it is an object of the present invention to provide stoving-resistant coating compositions, particularly coating compositions which may used for producing anti-gravel primer coatings.

This objective may be achieved with the coating compositions of the present invention which are described in detail hereinafter.

It has unexpectedly been found that coating compositions based on ε-caprolactam-blocked NCO prepolymers prepared from aromatic diisocyanates and polyester polyols in combination with aliphatic polyamines yield coatings which, in contrast to the coatings of DE-PS 2 131 299, give very good results in the antigravel test approved by the Verband der Deutschen Automobilindustrie, even under extreme stoving conditions (e.g. 200° C. for 20 minutes). Another surprising finding was that the simultaneous presence of ester groups and free amino groups in the compositions does not result in undesired side reactions during the stoving process or in loss of stability of the coating compositions during storage.

SUMMARY OF THE INVENTION

The present invention relates to a thermosetting coating composition based on a binder composition containing A) prepolymers containing isocyanate groups blocked with ε-caprolactam, having an average molecular weight of 1000 to 10,000 and prepared from A1) aromatic polyisocyanates and A2) a component containing at least one organic compound having hydroxyl groups wherein 50 to 100 hydroxyl equivalent percent of component A2) is based on polyesters containing hydroxyl groups and 0 to 50 hydroxyl equivalent percent is based on polyhydroxyl compounds which are free from ester groups and B) a hardener component containing at least one cycloaliphatic polyamine having at least two primary amino groups, in an equivalent ratio of blocked isocyanate groups to amino groups of 1:1 to 1:1.5.

The invention also relates to use of the coating compositions to produce stoving-resistant gravel-proof primer coatings on optionally pretreated metal substrates.

DETAILED DESCRIPTION OF THE INVENTION

The aromatic polyisocyanates A1) are preferably commercially available aromatic polyisocyanates such as 2,4-diisocyanate toluene; mixtures thereof with up to 35 wt. % of 2,6-diisocyanate toluene; 4,4'-diisocyanate diphenyl methane; mixtures thereof with up to 50 wt. %, preferably up to 40 wt. % of 2,4'-diisocyanate diphenyl methane, and optionally up to 5 wt. % of 2,2'-diisocyanate diphenyl methane; mixtures of these diisocyanato diphenyl methane isomers with their higher homologues containing more than two isocyanate groups, wherein mixtures usually contain at least 80 wt. % of the aforementioned diisocyanato diphenyl methane isomers; and mixtures of the polyisocyanates mentioned by way of example. In the preceding all references to wt. % are based on the weight of the mixture.

The polyhydroxyl compounds A2) are predominantly polyesters containing hydroxyl groups or mixtures of polyesters containing hydroxyl groups with up to 50 hydroxyl equivalent percent of polyhydroxyl compounds free from ester groups, preferably polyethers containing hydroxyl groups. These optional polyether polyols may be used to regulate the viscosity.

The polyester polyols, i.e., polyesters containing hydroxyl groups, are preferably condensation products of polybasic acids or anhydrides of polybasic acids with excess quantities of polyhydric alcohols. Suitable polybasic acids or acid anhydrides include adipic acid, maleic acid, maleic acid anhydride, phthalic acid, phthalic acid anhydride, tetrahydrophthalic acid, tetrahydrophthalic acid anhydride, hexahydrophthalic acid, hexahydrophthalic acid anhydride and mixtures of these polybasic acids and/or acid anhydrides.

The polyhydric alcohols include those having a molecular weight of 62 to 200 such as ethylene glycol, propylene glycol, the isomeric butanediols, pentanediols, hexanediols and octanediols, glycerol, trimethylol propane and mixtures of these polyhydric alcohols. The polyester polyols which are suitable for use as all or a portion of component A2) have a molecular weight of 400 to 4000, preferably 500 to 2000, which can be calculated from the amounts of the starting materials. Particularly preferred polyester polyols have a molecular weight of 500 to 2000 and are prepared from adipic acid and neopentyl glycol and/or 1,6-dihydroxyhexane.

The polyester polyols A2) also include polylactone diols, e.g., reaction products of hexanediol-1,6 with ε-capralactone having a molecular weight of 500 to 1500.

Other examples of polyester polyols suitable as all or a portion of component A2) include polycarbonate diols, preferably hexanediol-1,6-polycarbonate diols having a molecular weight of 500 to 2000, which may be obtained in known manner by condensation of the diol with diphenyl carbonate or dimethyl carbonate.

A portion of the polyester polyols A2) may be based on oligoesters of long-chain carboxylic acids containing hydroxyl groups such as castor oil. Use of these esters, however, is less preferable. They are used, if at all, in quantities not exceeding 30 hydroxyl equivalent of component A2).

The option polyhydroxy polyethers are known polyaddition products of epoxides, e.g. ethylene or propylene oxide, to low molecular weight polyols. It is preferred to use propylene oxide polyethers initiated with bisphenol A or trimethylol propane and having a molecular weight of 344 to 3000, preferably 344 to 800. The molecular weight is calculated from the content of hydroxyl groups and the functionality. It is also possible, though less preferred, to use other polyhydroxyl compounds which are free from ester groups as a portion of component A2), e.g., the polyhydric alcohols having a molecular weight of 62 to 200 which have been described as starting materials for the polyester polyols.

The blocked NCO prepolymers may be prepared in known manner, e.g., in a two-stage reaction by reacting the polyhydroxyl compounds A2) with excess quantities of polyisocyanates A1. Optionally, a large excess of the polyisocyanate may be used followed by removal of unreacted polyisocyanate after formation of the prepolymer, e.g., by distillation, preferably in a thin layer evaporator. However, the reaction is preferably conducted while maintaining an NCO/OH equivalent ratio of 2:1 to 2.5:1. The nature and proportions of the starting components A1) and A2) are chosen so that the resulting NCO prepolymers have an NCO content of 3.0 to 7.0, preferably 4.5 to 6.0 wt. %. After preparation of the NCO prepolymers, they are blocked, preferably stoichiometric quantities of ε-caprolactam, optionally in the presence of solvents. Both reactions are normally carried out at temperatures of 60° to 120° C., preferably 80° to 100° C.

Alternatively, the blocked NCO prepolymers A) can be manufactured in a one-pot reaction, wherein the polyhydroxyl compounds A2) and the blocking agent, preferably ε-caprolactam, are reacted with the polyisocyanate A1) within the aforementioned temperature range until the NCO bands disappear (IR spectrum). As a rough approximation, the proportions of the reactants are chosen so as to provide about one hydroxyl and one equivalent of blocking agent per 2 NCO equivalents.

To obtain coating compositions with optimum spray viscosity, the resulting blocked NCO prepolymers A) can be diluted with about 25 to 50 wt. %, based on the weight of the solution, of organic solvents. Examples of suitable solvents include Solvesso 100 solvent, solvent naphtha, isobutanol, butyl acetate and/or methoxypropyl acetate.

The hardener component B) is preferably a cycloaliphatic polyamine with at least two primary amino groups. Examples include 4,4'-diaminodicyclohexyl methane, 1,4-diamino cyclohexane, 3,3,5-trimethyl-5-aminomethyl cyclohexyl amine (IPDA) and the perhydrogenated triamino diphenyl methanes used in DE-OS 3 417 683 to produce the corresponding cycloaliphatic triisocyanates. Mixtures of these polyamines may also be used. 3,3'-dimethyl-4,4'-diamino-dicyclohexyl methane is preferred.

The binder compositions are produced by mixing components A) and B) and optionally the previously described solvents. The amounts of the components are chosen to provide an equivalent ratio of blocked NCO groups to amino groups of 1:1 to 1:1.5, preferably 1:1.1 to 1:1.4.

The coating compositions according to the invention may also contain conventional coating additives and auxiliaries such as pigments, levelling agents, UV stabilizers, anti-oxidizing agents, fillers and thixotropic agents.

The binder compositions can be combined with the additives and auxiliaries before, during or after components A) and B) have been mixed.

The coating compositions according to the invention are particularly suitable for producing stoving coatings on metal substrates which may optionally be pretreated, preferably metal substrates used for car manufacture. The coatings are preferably stoved at temperatures of 160° to 200° C.

In the following examples, all part and percentages are by weight unless otherwise indicated.

EXAMPLES

EXAMPLE 1

This example describes the preparation of a coating composition according to the invention and the properties of the resulting coating.

| 1.1 Preparation of the binder composition | |
|---|---|
| Prepolymer Ingredients | |
| 510 g (0.6 equiv) | of an adipic acid/hexanediol/neopentyl glycol polyester (weight ratio of hexanediol to neopentyl glycol = 77:36), OH number 66 |
| 110 g (0.4 equiv) | of a polyoxypropylene glycol initiated with bisphenol A, OH number 204 |
| 183 g (2.1 equiv) | of 2,4-toluylene diisocyanate |
| 124 g (1.1 moles) | of ε-caprolactam |
| 309 g (75%) | of Solvesso 100 solvent |
| 1236 g (1.1 equiv of blocked NCO groups) | |
| Binder Ingredients | |

| 1.1 Preparation of the binder composition | |
|---|---|
| 100 g (0.089 equiv) | of the aforementioned blocked NCO prepolymer |
| 15.0 g (0.126 equiv NH$_2$) | of 3,3'-dimethyl-4-4'-diamino dicyclohexyl methane |
| Equiv ratio of blocked NCO/NH$_2$ = 1:1.4. | |

Procedure

The polyester, polyether and toluylene diisocyanate were mixed in the quantities set forth above and heated to about 80° to 90° C. with agitation. After the reaction at 90° C. had proceeded for about 2½ hours, the measured NCO content was 5.5% (calculated 5.7%). Portions of pulverulent ε-caprolactam were added and the mixture was diluted with Solvesso 100 solvent and reacted at 90° C. for a further 5 hours until no NCO content was detectable (IR spectrum). The blocked NCO prepolymer solution had a viscosity at 23° C. of about 8000 mPas and a blocked NCO equivalent weight of 1130 g.

The soft segment component, i.e., the polyester/polyether segment of the NCO prepolymer contained 60 equivalent % of a polyester containing hydroxyl groups and 40 equivalent % of polyether containing hydroxyl groups. As is apparent from the weights of the starting components, the polyester was the dominant hydroxyl group-containing component:
82.3 wt. % polyester
17.7 wt. % polyether.

In order to produce the binder, 100parts of the aforementioned blocked NCO prepolymer-solution were mixed with 15 parts of 3,3'-dimethyl-4,4'-diamino dicyclohexyl methane.

| 1.2 Production of the coating composition | |
|---|---|
| 100.0 parts | of the blocked NCO prepolymer from Example 1.1 |
| 15.0 parts | of 3,3'-dimethyl-4,4'-diamino dicyclohexyl methane |
| 11.3 parts | of titanium dioxide (rutile type) |
| 1.2 parts | of iron oxide black |
| 90.5 parts | of barium sulphate (extender) |
| 2.9 parts | of highly dispersed silicic acid |
| 40.4 parts | of ethoxypropyl acetate/solvent naphtha 150 |
| 261.3 parts | |

The components were dispersed in a dissolver (7000 rpm) for about 30 minutes. The resulting anti-gravel primer was usable in this form in the air or airless process at 40 to 50° C. The coating composition was stored for two months at 50° C. without a change in viscosity.

1.2.1 Production of test sheets

Phosphated car-body sheets were first coated with a commercial cathode electrode position coating (German abbreviation KTL) and stoved at 190° C. for 20 minutes (layer thickness 15 to 20 μ). A layer (dry film thickness 120 μ) of the primer according to the invention was then applied. After air drying for 1 minute, 40 μ of a conventional polyester-melamine filler was sprayed "wet on wet" without further intermediate drying. In the conventional process the coating is stoved at 160° C. for about 30 minutes. To test the stoving resistance, the coating was stoved for 20 minutes at 200° C. Finally, a 40 μ thick layer of a commercial acrylate stoving top coat (TSA) was applied and stoved at 160° C. for 20 minutes.

1.3 Stoving test

The coated sheets were subjected to the "VDA" (Verband der Deutschen Automobilindustrie) test in a gravel test device (model 508 by Messrs Erichsen). The test details were given under the following headings: multiple impacts with 500 g steel shot, 4 to 5 mm diameter, bombarding pressure 1.5 to 2 bar, handling time about 5 s. The effects of the test were then shown by a corrosion test, i.e., the salt mist test according to ASTM 3117. This test has ten criteria based on a picture table between the characteristic values 0 to 5.

The anti-gravel primer in this example had the best possible test result, a rating of 0 to 1, i.e., the coating structure remained intact. There were no shiny metal patches on the laminated sheet, indicating no penetration through the multi-layer coating structure. The sheet was given the mark 1 because of a few small corrosion spots the size of pin pricks.

Example 2 (Comparison Example)

This example describes the construction of a prior art coating composition and the properties of a coating obtained therewith.

| 2.1 Preparation of the binder composition | |
|---|---|
| Prepolymer Ingredients | |
| 1143.0 g (1.0 equiv) | of a polyether polyol, OH number 49, produced by the propoxylation of a mixture of trimethylol propane and glycerol in a weight ratio of 2.9:1 and subsequent ethoxylation of the propoxylated product (PO:EO weight ratio = 95:5) |
| 135.6 g (1.2 moles) | of ε-caprolactam |
| 191.4 g (2.2 equiv) | of 2,4-toluylene diisocyanate |
| 1470.0 g (1.2 equiv of blocked NCO groups) | |
| Binder Ingredients | |
| 100.0 g (0.098 equiv) | of blocked NCO prepolymer |
| 16.3 g (0.137 equiv) | of 3,3'-dimethyl-4,4'-diaminodicyclohexyl methane |
| Equiv ratio of blocked NCO/NH$_2$ = 1:1.4 | |

Procedure

The anhydrous polyether, ε-caprolactam and toluylene diisocyanate were weighed and heated to 100° C. with intermittent agitation. The reaction was continued at this temperature for about 5 hours until no NCO content was detectable (IR spectrum). The blocked, solvent-free NCO prepolymer had a viscosity at 23° C. of about 30,000 mPas and a blocked NCO equivalent weight of 1225 g.

| 2.2 Preparation of the coating composition | |
|---|---|
| 100.0 parts | of the blocked NCO prepolymer from Example 2.1 |
| 16.3 parts | of 3,3'-dimethyl-4,4'-diamino dicyclohexyl methane |
| 11.6 parts | of titanium dioxide (rutile type) |
| 1.3 parts | of iron oxide black |
| 90.8 parts | of barium sulphate (extender) |
| 3.0 parts | of highly dispersed silicic acid |
| 50.0 parts | of ethoxypropyl acetate/solvent naphtha 150 |
| 273.0 parts | |

The components were blended into a sprayable anti-gravel primer as described in Example 1.2 and applied to test sheets which had previously been coated with the cathode electrodeposition coating (KTL) described in Example 1.2.

2.3 Stoving test

The coated sheets were subjected to the gravel test described in Example 1.3.

The test result for the thin-layer overspray region was a rating of about 4, the third value from the bottom, i.e., the shiny metal or KTL was exposed over most of the test area. The anti-gravel primer, filler and top coat were almost completely removed by the shot from the test device. This showed that the adhesion of the anti-gravel primer was Practically destroyed by the stoving process.

EXAMPLE 3

| 3.1 Production of the binder composition | |
|---|---|
| Prepolymer Ingredients | |
| 600 g (0.6 equiv) | of a hexanediol-1,6 polycarbonate, OH number 56 |
| 110 g (0.4 equiv) | of the polyoxypropylene glycol initiated with bisphenol A glycol from Example 1.1 |
| 124 g (1.1 moles) | of ε-caprolactam |
| 183 g (1.0 equiv) | of 2,4-toluylene diisocyanate (TDI) |
| 550 g (65%) | Solvesso 100 solvent |
| 1567 g (1.1 equiv of blocked NCO groups) | |
| Binder Ingredients | |
| 100 g (0.0638 equiv) of | the aforementioned blocked NCO prepolymer |
| 10 g (0.084 equiv NH₂) | of 3,3'-dimethyl-4,4'-diamino dicyclohexyl methane |
| Equiv ratio of blocked NCO/NH$_2$ = 1:1.3 | |

Procedure

A solution of the polyols, ε-caprolactam and Solvesso 100 solvent was prepared by heating (about 50° C.) and agitation. The total quantity of TDI was poured at one time into the solution and reacted at 100° C. After a reaction time of about 4 hours, no NCO content was detectable. The blocked NCO prepolymer solution had a viscosity at 23° C. of about 3400 mPa.s and a blocked NCO equivalent weight of 1425 g.

In order to produce the binder, 100 parts of this prepolymer solution were mixed with 10 parts of 3,3'-dimethyl-4,4'-diamino dicyclohexyl methane.

| 3.2 Production of the coating composition | |
|---|---|
| 100.0 parts | of the blocked NCO prepolymer from Example 3.1 |
| 10.0 parts | of 3,3'-dimethyl-4,4'-diamino dicyclohexyl methane |
| 11.5 parts | of titanium dioxide (rutile type) |
| 1.2 parts | of iron oxide black |
| 90.5 parts | of barium sulphate (extender) |
| 3.3 parts | of highly dispersed silicic acid |
| 50.5 parts | of ethoxypropyl acetate/solvent naphtha 150 |
| 267.0 parts | |

The aforementioned compounds were converted into a sprayable anti-gravel primer as described in Examples 1.2 and 1.2.1 and applied to sheets for testing.

3.3 Result of the Stoving Test

The test sheets coated with the aforementioned anti-gravel primer were "over-stoved" as described in Example 1.2.1 and then subjected to the VDA gravel test (see Example 1.3).

The anti-gravel primer in this example, like that in Example 1, had the best possible rating of 0 to 1, i.e., the entire coating structure consisting of KTL, the aforementioned primer and the commercial filler and top coat described in Example 1 remained intact.

EXAMPLE 4

| 4.1 Preparation of the binder composition | |
|---|---|
| Prepolymer Ingredients | |
| 510 g (0.6 equiv) | of the adipic acid/hexanediol/neopentyl glycol polyester from Example 1 |
| 102.0 g (0.3 equiv) | of castor oil |
| 5.8 g (0.1 equiv) | of hexanediol-1,6 |
| 125.0 g (1.1 moles) | of ε-caprolactam |
| 183.0 g (2.1 equiv) | of 2,4-toluylene diisocyanate (TDI) |
| 310.2 g (75%) | of Solvesso 100 solvent |
| 1236.0 g (1.1 equiv of blocked NCO groups) | |
| Binder Ingredients | |
| 100 g (0.089 equiv) | of the aforementioned NCO prepolymer |
| 13.8 g (0.116 val NH₂) | of 3,3'-dimethyl-4,4'-diamino dicyclohexyl methane |
| Equiv ratio of blocked NCO/NH$_2$ = 1:1.3. | |

Working

The polyester, hexanediol-1,6, castor oil and ε-caprolactam were dissolved with agitation and heating (about 50° C.) in Solvesso 100 solvent. The total quantity of TDI was added and the temperature was raised to about 90° C. After reacting at 90° C. for about 4 hours, no further NCO was detectable. The blocked NCO prepolymer solution had a viscosity at 23° C. of about 6000 mPas and a blocked NCO equivalent weight of 1124 g.

To produce the binder, 100 parts of this prepolymer solution were mixed with 13.8 parts of 3,3'-dimethyl-4,4'-diamino dicyclohexyl methane.

| 4.2 Production of the coating agent | |
|---|---|
| 100.0 parts | of the blocked NCO prepolymer from Example 4.1 |
| 13.8 parts | of 3,3'dimethyl-4,4'-diamino dicyclohexyl methane |
| 11.0 parts | of titanium dioxide (rutile type) |
| 1.0 part | of iron oxide black |
| 89.5 parts | of barium sulphate (extender) |
| 2.7 parts | of highly dispersed silicic acid |
| 40.3 parts | of ethoxypropyl acetate/solvent naphtha 150 |
| 258.3 parts | |

The aforementioned components were dispersed in a dissolver as described in Example 1.2. The resulting anti-gravel primer was usable in this form in the air or airless process at 40° to 50° C.

4.3 Result of the Stoving Test

As described in Example 1.2.1 test sheet were prepared and then subjected to the VDA gravel test described in Example 1.3.

The test result, as in Example 1, was the best possible, i.e., a rating of 0 to 1. The coating structure was completely undamaged.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermosetting coating composition containing a binder composition wherein the binder composition consists essentially of A) a prepolymer containing isocyanate groups blocked with ε-caprolactam, having an average molecular weight of 1000 to 10,000 and prepared from
   A1) an aromatic polyisocyanate and
   A2) a component containing at least one organic compound having hydroxyl groups wherein 50 to 100 hydroxyl equivalent percent of component A2) is based on a polyester containing hydroxyl groups and 0 to 50 hydroxyl equivalent percent is based on a polyhydroxyl compound which is free from ester groups and
B) a hardener component containing at least one cycloaliphatic polyamine having at least two primary amino groups, in an equivalent ratio of blocked isocyanate groups to amino groups of 1:1 to 1:1.5.

2. A coated substrate wherein the coating is obtained from a thermosetting coating composition containing a binder composition wherein the binder composition consists essentially of
A) a prepolymer containing isocyanate groups blocked with ε-caprolactam, having an average molecular weight of 1000 to 10,000 and prepared from
   A1) an aromatic polyisocyanate and
   A2) a component containing at least one organic compound having hydroxyl groups wherein 50 to 100 hydroxyl equivalent percent of component A2) is based on a polyester containing hydroxyl groups and 0 to 50 hydroxyl equivalent percent is based on a polyhydroxyl compound which is free from ester groups and
B) a hardener component containing at least one cycloaliphatic polyamine having at least two primary amino groups, in an equivalent ratio of blocked isocyanate groups to amino groups of 1:1 to 1:1.5.

* * * * *